US00RE40042E

(19) United States
(12) Reissued Patent
Chang

(10) Patent Number: US RE40,042 E
(45) Date of Reissued Patent: Feb. 5, 2008

(54) DUAL-FUNCTIONAL MEDIUM SHREDDING MACHINE STRUCTURE

(75) Inventor: Frank Chang, Taipei (TW)

(73) Assignee: Michilin Prosperity Co., Ltd., Taipei Hsien (TW)

(21) Appl. No.: 11/109,843

(22) Filed: Apr. 20, 2005

Related U.S. Patent Documents

Reissue of:
(64) Patent No.: 6,550,701
Issued: Apr. 22, 2003
Appl. No.: 09/684,777
Filed: Oct. 10, 2000

(51) Int. Cl.
*B02C 18/22* (2006.01)

(52) U.S. Cl. ..... 241/36; 241/76; 241/166; 241/236

(58) Field of Classification Search ..... 241/236, 241/100, 36, 76, 166
See application file for complete search history.

(56) References Cited

U.S. PATENT DOCUMENTS

| | | | | | |
|---|---|---|---|---|---|
| 2,686,466 | A | * | 8/1954 | Lee | 100/97 |
| 3,724,766 | A | * | 4/1973 | Bosland | 241/100 |
| 4,650,127 | A | | 3/1987 | Radwanski et al. | |
| 4,821,967 | A | | 4/1989 | Mariyama | |
| 4,842,205 | A | | 6/1989 | Araki et al. | |
| 4,893,759 | A | | 1/1990 | Mizobata | |
| 4,957,243 | A | | 9/1990 | Kanagaki et al. | |
| 4,982,907 | A | * | 1/1991 | Sedgwick et al. | 241/236 |
| 5,071,080 | A | * | 12/1991 | Herbst et al. | 241/166 |
| 5,188,301 | A | | 2/1993 | Hasegawa | |
| 5,474,243 | A | * | 12/1995 | Schwelling | 241/166 |
| 5,609,307 | A | * | 3/1997 | Rota | 241/73 |
| 5,954,280 | A | * | 9/1999 | Kroger et al. | 241/166 |
| 5,961,059 | A | * | 10/1999 | Kroger | 241/236 |
| 6,065,696 | A | | 5/2000 | Tsai | |
| 6,241,170 | B1 | * | 6/2001 | St. Clair | 241/167 |
| 6,684,928 | B2 | | 2/2004 | Dieckmann | |
| 6,765,193 | B2 | | 7/2004 | Sumriddetchkajorn | |

FOREIGN PATENT DOCUMENTS

| | | | |
|---|---|---|---|
| DE | 2 214 800 | | 9/1973 |
| DE | 2702147 | * | 7/1978 |

(Continued)

OTHER PUBLICATIONS

Panasonic KX–4100 Auto–Feed paper Shredder photograph, Service Manual, and Supplement–1 to the Service Manual.

(Continued)

*Primary Examiner*—Mark Rosenbaum
(74) *Attorney, Agent, or Firm*—Bacon & Thomas, PLLC

(57) ABSTRACT

This invention is related to a dual-functional medium shredding machine structure, specifically designed for shredding or destroying paper printed with data to be destroyed, optical discs containing data to be destroyed, or expired credit cards. This invention mainly implements a pair of shredding roller blades with sharp teeth as shredding means, and is characterized by providing separate feeding inports, including a paper inport for feeding paper in an inclined orientation, and a disc inport for feeding discs in a vertical orientation, wherein the inports are each led to the same shredding roller blades such that, regardless of the type of substance being fed by the user, the paper or the discs can both be shredded by the shredding roller blades, and the shredded scraps are dispensed to separate collectors through an identical exit by means of an auto-revolving switch plate; and a touch switch at each of the inports such that, while feeding the paper or the discs, the touch switch activates the shredding roller blades to perform shredding task, and drives the switch plate so as to dispense shredded scraps of different substance into different collectors.

11 Claims, 4 Drawing Sheets

FOREIGN PATENT DOCUMENTS

| | | | |
|---|---|---|---|
| DE | 3633 109 | A1 | 3/1988 |
| DE | 36 33 109 | | 3/1988 |
| DE | 10008442 | | 8/2001 |
| DE | 10008442 | A1 | 8/2001 |
| EP | 0 281 136 | | 9/1988 |
| EP | 503957 | | 9/1992 |
| EP | 0 505 109 | | 9/1992 |
| EP | 1127621 | A2 | 8/2001 |
| FR | 76 37761 | | 7/1978 |
| FR | 77 06557 | | 10/1978 |
| GB | 2 171029 | | 8/1986 |
| JP | 06312144 | | 11/1994 |

OTHER PUBLICATIONS

German language brochure of Schleicher & Co. AG.

Brochure for an Intimus Datenex 2000 shredder.

Brochure for an Ideal 2400 Paper Shredder.

Petition to the Director dated Apr. 19, 2005, to reverse Decision that denies the Request for Certificate of Correction of Claim 4 of U.S. Patent No. 6,550,701, with a copy of Decision as Exhibit A, and a copy of the Request as Exhibit B.

Amended Memorandum and Order dated Mar. 7, 2006, which denies Court correction of Claim 4 of U.S. Patent No. 6,550,701.

"Memorandum Opinion and Order" dated Aug. 30, 2006, *Michilin Prosperity Co.* v. *Fellowes Manufacturing Co.*, Civil Action No. 04–1025 (RWR) (JMF), U.S. Dist. Ct. For the District of Columbia.

Kobra 240 SS5 Electronic Data Media Shredder brochure (2 pages).

Shredding Device Drawing.

Flyer describing Intimus shredder for CD–ROM's , diskettes, and credit cards, Jan. 1999.

* cited by examiner

DUAL-FUNCTIONAL MEDIUM SHREDDING MACHINE STRUCTURE

Matter enclosed in heavy brackets [ ] appears in the original patent but forms no part of this reissue specification; matter printed in italics indicates the additions made by reissue.

This invention is related to a dual-functional medium shredding machine structure, that not only serves as conventional paper shredding machines, but also allows shredding of the commonly known optical discs containing data or expired credit cards or membership cards through a disc inport or a card inport specifically for such media. This invention mainly implements a pair of shredding roller blades with sharp teeth as shredding means for shredding paper, credit cards, and membership cards. This invention is provided with separate feeding inports, including an inclined inport for feeding paper, and a vertical inport for feeding discs or cards, wherein the inports are each led to the same shredding roller blades such that, regardless of the type of substance being fed by the user, the paper, cards, or the discs can all be shredded by the shredding roller blades. This invention is characterized in that: an inclined inport of a longer channel and a vertical inport of a shorter channel are each provided at the machine body above the roller blades; touch switches are provided at each of the inports such that, while feeding the paper, cards, or discs, the touch switch activates the shredding roller blades to perform shredding task, and drives the switch plate so as to dispense shredded scraps of different substance into different bins.

BACKGROUND OF INVENTION

Conventional paper shredding machines mostly include a roller blade set constructed of two roller blades that shred or cut paper to be fed into strips or scraps as a result of the opposed rotations of the two roller blades such that information as recorded on the paper is destroyed for confidentiality, and the strips or scraps of paper can be easily compressed to reduce processing space. However, optical discs, regardless of CD-ROM discs or CD-R discs, rather than paper have evolved to be one of the major means for storing information. Once information contained in such optical discs has lost its original value and needs to be destroyed, manually breaking the optical discs not only cannot destroy the information as stored, it also may cause personal injuries. An optimum measure is to shred these discs by means of mechanical operations such as those in conventional paper shredding machines.

In the highly economized society as of today, plastic money, such as credit cards, debit cards, ATM cards, or even membership cards issued by enterprises for promotional purposes, and registration cards issued by medical institutions, have made "cards" become an article that can certainly be found in everyone's pocket. When these cards have expired or been replaced with new cards, the most commonly adopted measure is to cut the cards in halves for disposal. However, danger still exists in such a disposing measure because most cards carry the user's signature and the registration cards may also carry personal, medical history, or personal information. It is possible that other individuals with malicious intention may still have access to these halved cards.

SUMMARY OF INVENTION

Though paper shredders are tools commonly used for destroying information, the inventor of this invention believes that the functions of the conventional paper shredders shall be expanded so as to perform shredding task on the same machine using an identical roller blade set regardless of the type of substance of the media to be shredded, given that the machine volume is not increased but the functions are enhanced. In other words, this invention intends to provide a medium shredding machine that allows paper shredding and disc shredding using the same machine.

In view of the above, the inventor made researches and developments in such a valuable subject matter and accomplished the "Dual-Functional Medium Shredding Machine Structure" that provides separate feeding inports, including a paper inport for feeding paper and a disc inport for feeding discs, wherein the inports are each led to the same shredding roller blades such that, and the shredded scraps are dispensed to separate bins through an identical exit by means of an auto-revolving switch plate.

It is thus a primary object of this invention to provide a "dual-functional medium shredding machine structure" specifically designed for shredding or destroying paper printed with data to be destroyed, and optical discs containing data to be destroyed, and expired credit cards. This invention mainly implements a pair of shredding roller blades with sharp teeth as shredding means, and is characterized by providing separate feeding inports, including a paper inport for feeding paper in an inclined orientation, and a disc inport for feeding discs in a vertical orientation, wherein the inports are each led to the same shredding roller blades such that, regardless of the type of substance being fed by the user, the paper or the discs can both be shredded by the shredding roller blades.

It is another object of this invention to provide a touch switch at each of the inports such that, while feeding the paper or the discs, the touch switch activates the shredding roller blades to perform shredding task, and drives the switch plate so as to dispense shredded scraps of different substance into different bins, whereby the paper and discs can all be destroyed and shredded while the different types of shredded scraps can be dispersed into different bins through the auto-switching function of the switch plate in order to sort the waste and to recycle the resources for environmental sakes.

In order to clearly delineate the objects, characteristics and advantages of the present invention, a few preferred embodiments are specifically explained in detail in accompany with the drawings as follows.

Figure 1:
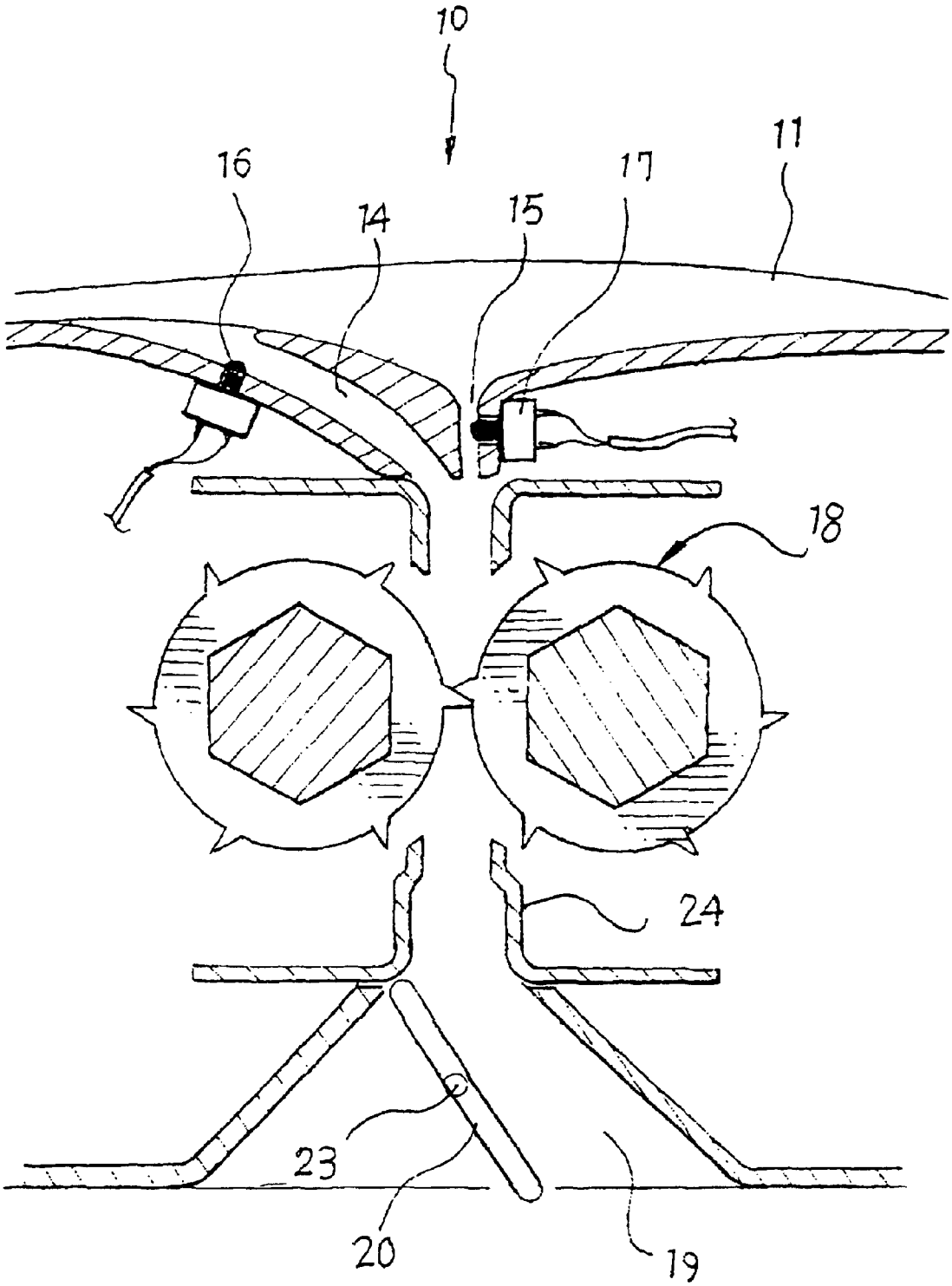
FIG. 1 is a cross-sectional view of this invention.

LIST OF REFERENCE NUMERALS 10 machine body
11 upperlid
12 base
13 power switch
14 paper inport -continued

| LIST OF REFERENCE NUMERALS |
|---|
| 15 disc inport |
| 16 paper touch switch |
| 17 disc touch switch |
| 18 roller blades |
| 19 scrap exit |
| 20 switch plate |
| 21 paper scrap bin |
| 22 disc scrap bin |
| 23 shaft |
| 24 driving component |
| 25 paper |
| 26 optical disc |

DETAILED DESCRIPTIONS OF EMBODIMENTS

This invention is related to a dual-functional medium shredding machine structure that is substantially dimensioned to the conventional paper shredding machines serving as tools for destroying information. This invention not only serves as a conventional paper-shredding machine, but also allows shredding of the commonly known optical discs or credit cards by implementing an identical set of roller blades and allows sorting and collection of different scraps.

Figure 4:
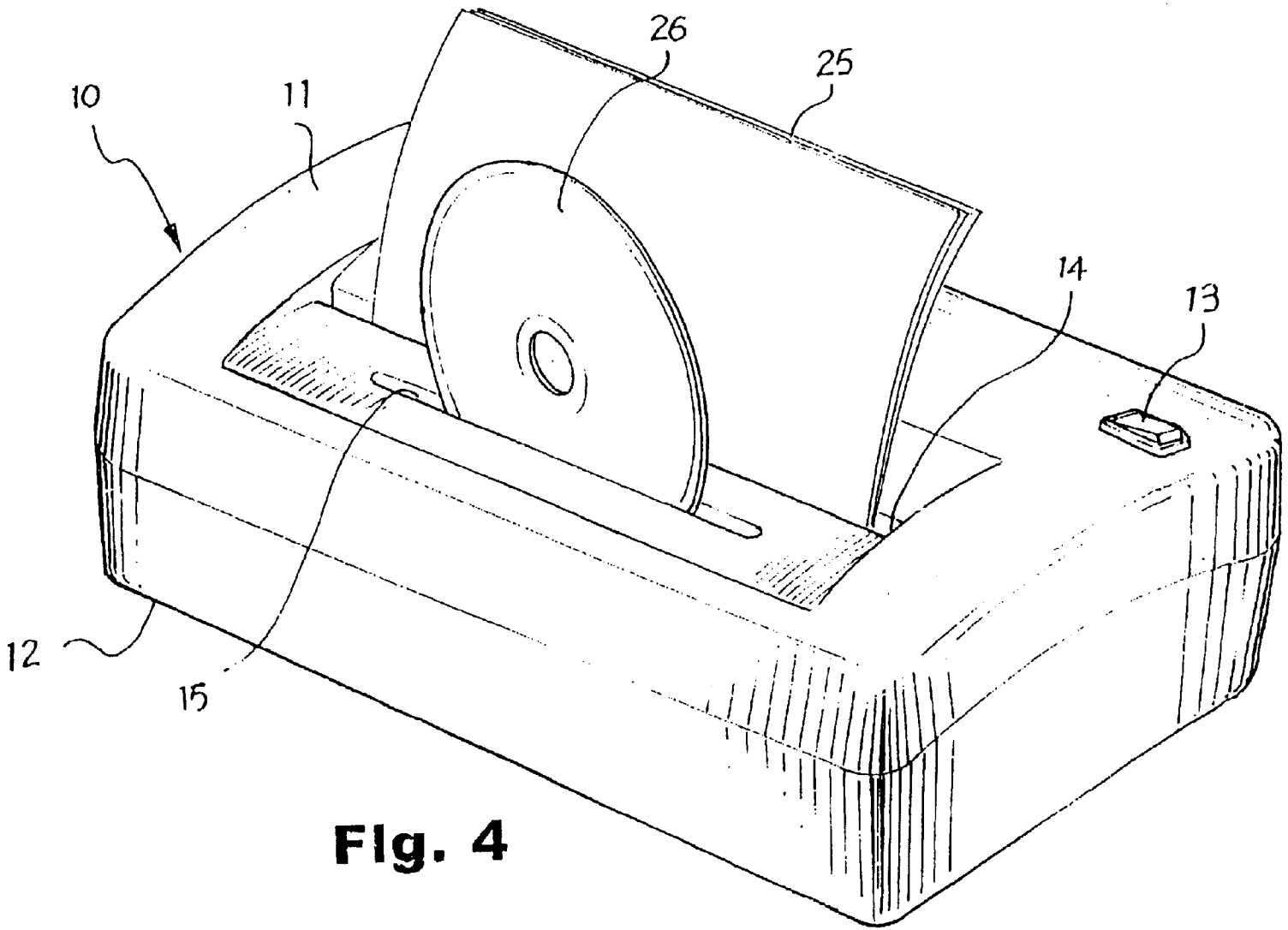
FIG. 4 is a perspective view illustrating the appearance of this invention.

As shown in FIGS. 1 and 4, a machine body 10 dimensioned to a conventional paper shredding machine is provided with a power switch 13 on a surface thereof, a pair of roller blades 18 provided therein and driven by a gearbox, and two inports on an upper lid 11 thereof, the inports including a paper inport 14 with an opening of a larger dimension and inclined, curved channel walls, and a disc inport 15 with an opening of a smaller dimension and vertical channel walls. The inports 14, 15 are each led to the shredding roller blades 18 such that, regardless of the type of substance being fed by the user, the paper 25 or the disc 26 can all be shredded by the shredding roller blades 18 through the intermeshing of roller blades 18. The disc inport 15, in principles, is designed to have an opening width that only allows a single piece of optical disc 26 to pass thereby preventing overloading and damaging of the roller blades 18.

Figure 2:
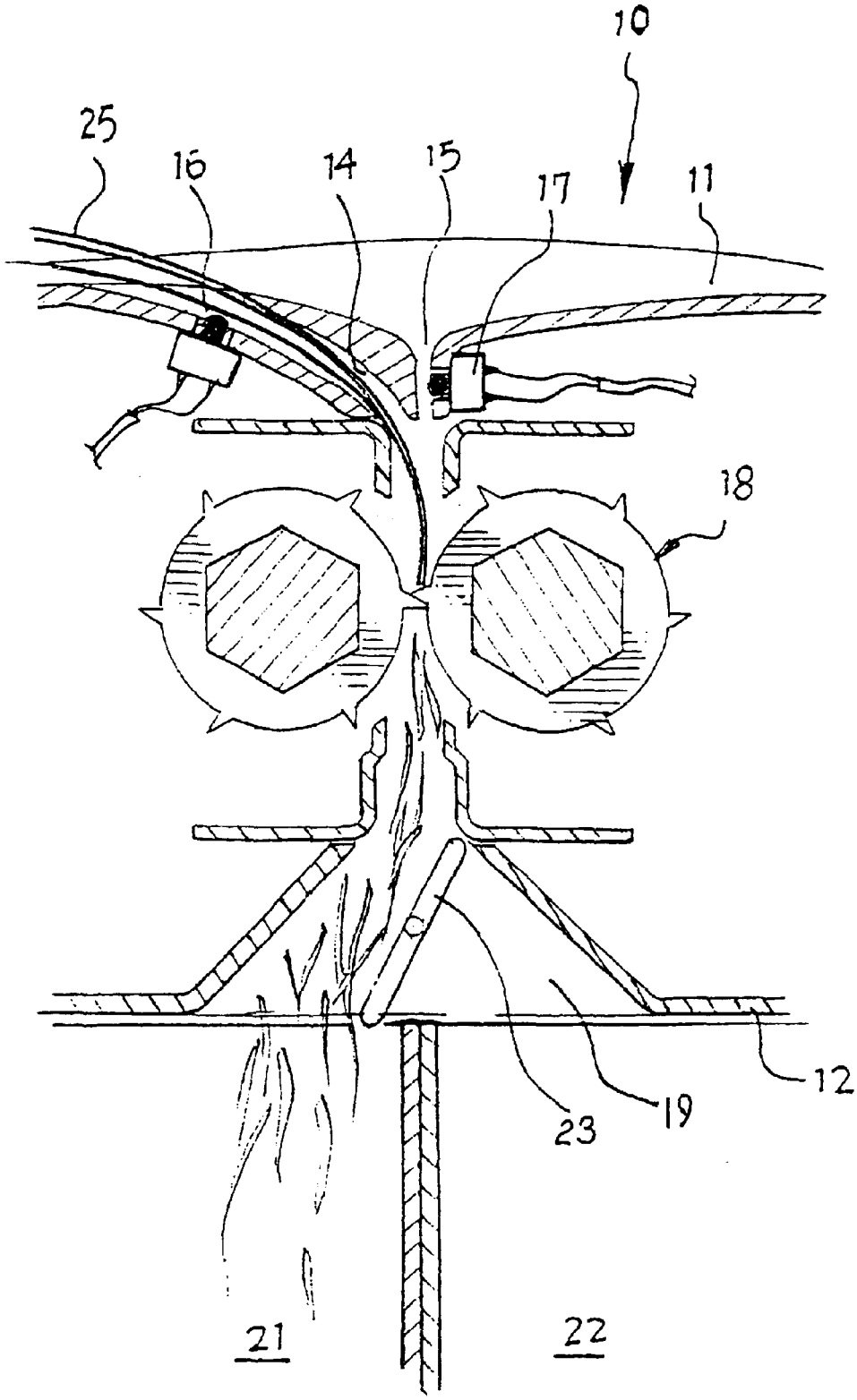
FIG. 2 is a cross-sectional view illustrating the invention under the paper shredding process.
Figure 3:
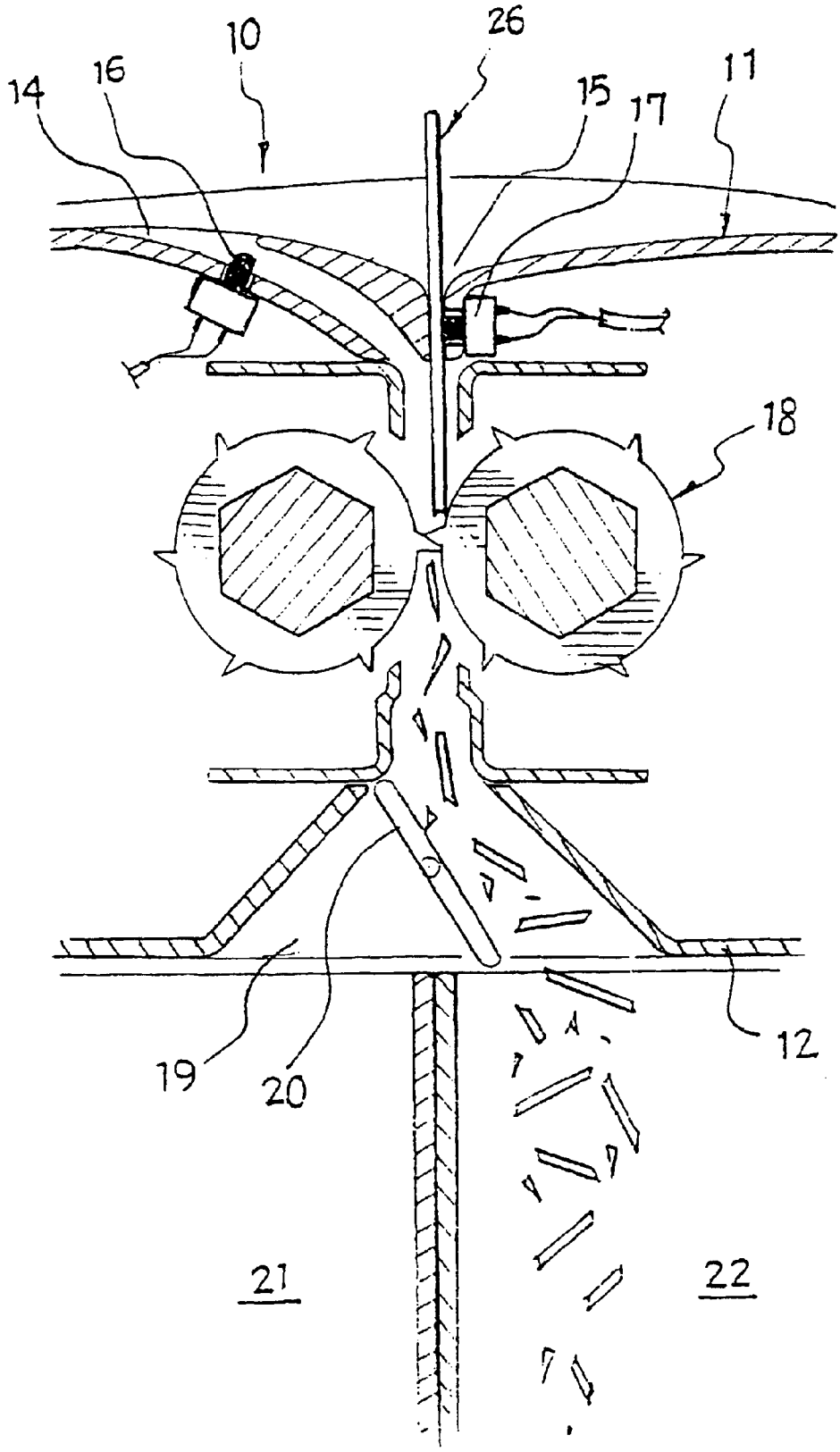
FIG. 3 is a cross-sectional view illustrating the invention under the disc shredding process.

The paper inport 14 and the disc inport 15 are, respectively, provided with a paper touch switch 16 and a disc touch switch 17 at appropriate locations of the openings or the channel walls. As shown in FIGS. 2 and 3, while feeding a piece of paper 25, the paper touches and activates the paper touch switch 16 so as to activate the shredding roller blades 18 to perform the intermeshing and shredding task. Likewise, while feeding an optical disc 26, the disc touches and activates the disc touch switch 17 so as to activate the shredding roller blades 18 to perform the intermeshing and shredding task.

In this invention, the machine body 10 is provided with a scrap exit 19 at a base 12 thereof. The scrap exit 19 is provided with a switch plate 20 that revolves about a shaft 23. The switch plate 20 can be driven to the desired direction by means of a conventional driving mechanism (not shown) so as to change the direction that the scraps are dispensed.

The two touch switches 16, 17, while being provided to activate the roller blades 18, can also activate the rotation of the switch plate 20 provided at the scrap exit 19 of the base 12 so as to change the direction of the scrap exit 19 thereby dispensing shredded scraps of different substance into different bins.

As shown in FIG. 2, while feeding one or more pieces of paper 25 into the paper inport 14, the paper 25 touches the paper touch switch 16, which not only activates rotation of the roller blades 18, but also drives rotation of the switch plate 20 so as to dispense the scrap exit 19 towards the paper scrap bin 21.

As shown in FIG. 32, while feeding an optical disc 26 into the disc inport 15, the disc 26 touches the disc touch switch 17, which not only activates rotation of the roller blades 18, but also drives rotation of the switch plate 20 so as to dispense the scrap exit 19 towards the disc scrap bin 22.

Because the "dual-functional medium shredding machine structure" of this invention provides two functions within an identical machine and uses an identical set of roller blades, the invention helps to reduce cost and improved space utilization. Furthermore, this invention uses two touch switches 16, 17 to activate directional change of a switch plate 20 so as to dispense shredded scraps of different substance into different bins. As such, the effects as achieved by this invention are not limited to destroying paper 25 or discs 26 within an identical machine, but also allows waste sorting and resource recycling for environmental sakes.

The "dual-functional medium shredding machine structure" of this invention uses two touch switches 16, 17 to activate the roller blades 18 and to drive rotational change of the switch plate 2 of the scrap exit 19 so as to dispense shredded scraps of different substance into different bins so as to facilitate waste sorting and resources recycling. However, it is known that people will mostly use this invention as means for shredding paper 25 in daily life or at professional sites; it is thus possible that scraps of discs 26 will only be a small proportion of paper. Though the two touch switches 16, 17 can drive rotational change of the switch plate 20 so as to dispense shredded scraps of different substance into different bins, the capacity of paper pin may be insufficient for most of the time. Furthermore, in consideration of reduction of manufacturing cost and in response to the market demands, the number of touch switches in this invention may be reduced to one, and the switch plate 20 as well as the accompanying driving mechanism may also be eliminated. In other words, a single touch switch is provided at an appropriate location beneath the two inports and between the roller blades, such that regardless of the type of substance being fed by the user, the paper 25 or disc 26 can both touch the touch switch so as to activate the roller blades to perform shredding task while the scraps are dispensed to an identical bin. As such, a simplified embodiment of this invention further reduces the number of components thereby reducing the manufacturing cost and enhancing competitiveness.

From the invention thus described, it will be obvious that this invention as described above is provided for explanation and that the invention may be varied in many ways, where such variations are not to be regarded as a departure from the spirit and scope of the invention, and all such modifications as would be obvious to one skilled in the art are intended for inclusion within the scope of the following claims.

What is claimed is:

1. A dual-functional medium shredding machine structure, that allows shredding of paper, optical discs, and credit cards, characterized in comprising:

a machine body being provided with a power switch on a surface thereof and roller blades therein, the roller blades being driven by a gearbox;

two inports on an upper limit thereof, the inports including a paper inport with an opening of a larger dimension and inclined, curved channel walls, and a disc inport with an opening of a smaller dimension and vertical channel walls, the inports being each led to the shredding roller blades such that, regardless of the type of substance being fed by a user, the paper or the disc can all be shredded by the shredding roller blades through the intermeshing of roller blades;

a paper touch switch being provided at an appropriate location between the paper inport and the roller blades; and a disc touch switch being provided at an appropriate location between the paper inport and the roller blades;

whereby the roller blades are activated by the touch switches when paper, discs, or credit cards are fed and touch the touch switches so as to activate the roller blades to perform intermeshing and shredding task.

2. The dual-functional medium shredding machine structure of claim 1, wherein the machine body is provided with a scrap exit at a base thereof, the scrap exit being provided with a switch plate that is switchable to a desired direction by means of a driving mechanism, such that while the paper touch switch or the disc touch switch is touched by paper, discs, or credit cards, the touch switch also activates rotation of the switch plate so as to change the direction of the scrap exit thereby dispensing shredded scraps of different substance into different bins.

3. The dual-functional medium shredding machine structure of claim 1, wherein the disc inport is dimensioned to have an opening width that only allows a single piece of optical disc or credit card to pass thereby preventing overloading and damaging of the roller blade.

4. The dual-functional medium shredding machine structure of claim 1, wherein the paper inport and the disc or card inport are both led to the roller blades, a single touch switch is provided between the roller blades such that regardless of the type of substances being fed by a user, the paper, disc, or credit cards can all touch the touch switch so as to activate the roller blades to perform shredding task while the scraps are all dispensed to an identical bin.

*5. A dual-functional medium shredding machine structure, that allows shredding of paper and optical discs or credit cards, characterized in comprising:*

*a machine body being provided with a power switch on a surface thereof and intermeshing shredding blades therein;*

*two inports on an upper lid thereof, the inports including a paper inport with an opening of a larger dimension and inclined, curved channel walls, and a disc or card inport with an opening of a smaller dimension and vertical channel walls, the inports being each led to the shredding blades such that, regardless of whether the type of substance being fed by a user is paper, an optical disc, or a card, the paper, card, or disc can all be shredded by the shredding blades through the intermeshing of the blades.*

*6. The dual-functional medium shredding machine structure of claim 5, further comprising a first blade-activation switch situated between the paper inport and the shredding blades and a second blade-activation switch situated between the disc or card inport and the shredding blades, wherein the machine body is provided with a scrap exit at a base thereof, the scrap exit being provided with a switch plate that is switchable to a desired direction by means of a driving mechanism, such that while a respective one of said first or second blade-activation switches is caused to activate said shredding blades by the presence of paper, a disc, or a card in one of the inports, the respective first or second blade-activation switch also activates rotation or the switch plate so as to change the direction of the scrap exit thereby dispensing shredded scraps of different substance into different bins.*

*7. The dual-functional medium shredding machine structure of claim 5, wherein the disc or card inport is dimensioned to have an opening width that only allows a single piece of optical disc or credit card to pass thereby preventing overloading and damaging of the shredding blades.*

*8. The dual-functional medium shredding machine structure of claim 5, wherein the paper inport and the disc or card inport are both led to the shredding blades, and a single switch is provided between the shredding blades such that regardless of the type of substance being fed by a user, the paper, disc, or credit cards can all cause the switch to activate the shredding blades to perform a shredding task while the scraps are all dispensed to an identical bin.*

*9. The dual-functional medium shredding machine structure of claim 5, wherein:*

*a first blade-activation switch is provided at an appropriate location between the paper inport and the shredding blades; and*

*a second blade-activation switch is provided at an appropriate location between the disc inport and the shredding blades;*

*whereby the shredding blades are activated by the first or second blade-activation switch to perform an intermeshing and shredding task when paper, discs, or credit cards are fed into either of the paper and disc or card inports.*

*10. A dual-functional medium shredding machine structure, that allows shredding of paper and optical discs or credit cards, characterized in comprising:*

*a machine body being provided with intermeshing shredding blades therein;*

*two inports on an upper lid thereof, the inports including a paper inport with an opening of a larger dimension and inclined, curved channel walls, and a disc or card inport with an opening of a smaller dimension and vertical channel walls, the inports being each led to the shredding blades such that, regardless of whether the type of substance being fed by a user is paper, an optical disc, or a card, the paper, card, or disc can all be shredded by the shredding blades through the intermeshing of the blades.*

*11. A dual-functional medium shredding machine structure, that allows shredding of paper and optical discs or credit cards, characterized in comprising:*

*a machine body being provided with intermeshing shredding blades therein;*

*two inports on an upper lid thereof, the inports including a paper inport with an opening of a larger dimension and inclined, curved channel walls, and a disc or card inport with an opening of a smaller dimension and vertical channel walls, the inports being each led to the shredding blades such that, regardless of whether the type of substance being fed by a user is paper, an optical disc, or a card, the paper, card, or disc can all be shredded by the shredding blades through the intermeshing of the blades; and*

*a switch arranged to activate the shredding blades to perform an intermeshing and shredding task when paper, an optical disc, or a card is being fed by the user.*

* * * * *

US00RE40042C1

(12) INTER PARTES REEXAMINATION CERTIFICATE (0435th)

United States Patent
Chang

(10) Number: US RE40,042 C1
(45) Certificate Issued: Aug. 28, 2012

(54) DUAL-FUNCTIONAL MEDIUM SHREDDING MACHINE STRUCTURE

(75) Inventor: Frank Chang, Taipei (TW)

(73) Assignee: Michilin Prosperity Co., Ltd., Sanchung, Taipei Hsien (TW)

Reexamination Request:
No. 95/000,165, Sep. 21, 2006

Reexamination Certificate for:

| | |
|---|---|
| Patent No.: | **Re. 40,042** |
| Issued: | **Feb. 5, 2008** |
| Appl. No.: | **11/109,843** |
| Filed: | **Apr. 20, 2005** |

Related U.S. Patent Documents

Reissue of:

| | |
|---|---|
| (64) Patent No.: | **6,550,701** |
| Issued: | **Apr. 22, 2003** |
| Appl. No.: | **09/684,777** |
| Filed: | **Oct. 10, 2000** |

(51) Int. Cl.
*B02C 18/22* (2006.01)

(52) U.S. Cl. ..... 241/36; 241/76; 241/166; 241/236

(58) Field of Classification Search ..... 241/36, 241/76, 166, 236
See application file for complete search history.

(56) References Cited

To view the complete listing of prior art documents cited during the proceeding for Reexamination Control Number 95/000,165, please refer to the USPTO's public Patent Application Information Retrieval (PAIR) system under the Display References tab.

*Primary Examiner*—Jimmy G Foster

(57) ABSTRACT

This invention is related to a dual-functional medium shredding machine structure, specifically designed for shredding or destroying paper printed with data to be destroyed, optical discs containing data to be destroyed, or expired credit cards. This invention mainly implements a pair of shredding roller blades with sharp teeth as shredding means, and is characterized by providing separate feeding inports, including a paper inport for feeding paper in an inclined orientation, and a disc inport for feeding discs in a vertical orientation, wherein the inports are each led to the same shredding roller blades such that, regardless of the type of substance being fed by the user, the paper or the discs can both be shredded by the shredding roller blades, and the shredded scraps are dispensed to separate collectors through an identical exit by means of an auto-revolving switch plate; and a touch switch at each of the inports such that, while feeding the paper or the discs, the touch switch activates the shredding roller blades to perform shredding task, and drives the switch plate so as to dispense shredded scraps of different substance into different collectors.

At the time of issuance and publication of this certificate the patent remains subject to pending reissue application number 11/790,892 filed Apr. 27, 2007. The claim content of the patent may be subsequently revised if a reisssue patent is issued from the reissue application.

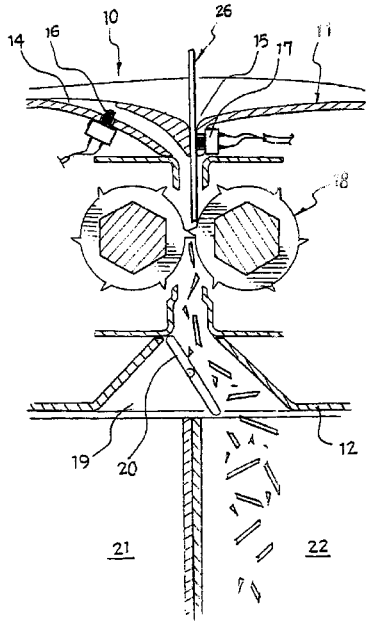

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

Claim 11 is cancelled.

Claims 1, 4, 5, 8 and 10 are determined to be patentable as amended.

Claims 3, 6, 7 and 9, dependent on an amended claim, are determined to be patentable.

Claim 2 was not reexamined.

1. A dual-functional medium shredding machine structure, that allows shredding of paper, optical discs, and credit cards, characterized in comprising:

a machine body being provided with a power switch on a surface thereof and one set of roller blades therein, the roller blades being driven by a gearbox;

two inports on an upper limit thereof, the inports including a paper inport with an opening [[of a larger dimension]] with a greater length in the upper lid sized to receive a piece of paper, and inclined, [[curved]] channel walls wherein the opposing, spaced apart channel walls curve in the same direction for feeding paper into the shredding blades, and a disc or card inport with an opening [[of a smaller dimension]] with a lesser length in the upper lid sized to receive an optical disc or credit card, and vertical channel walls, the inports being each led to the shredding roller blades such that, regardless of the type of substance being fed by a user, the paper or the disc can all be shredded by the shredding roller blades through the intermeshing of roller blades;

a paper touch switch being provided at an appropriate location between the paper inport and the roller blades; and a disc touch switch being provided at an appropriate location between the paper inport and the roller blades;

whereby the roller blades are activated by the touch switches when paper, discs, or credit cards are fed and touch the touch switches so as to activate the roller blades to perform intermeshing and shredding task.

4. The dual-functional medium shredding machine structure of claim 1, wherein the paper inport and the disc or card inport [[are]] both[[led]] lead to the roller blades, a single touch switch is provided between the roller blades such that regardless of the type of substances being fed by a user, the paper, disc, or credit cards can all touch the touch switch so as to activate the roller blades to perform shredding task while the scraps are all dispensed to an identical bin.

*5. A dual-functional medium shredding machine structure, that allows shredding of paper and optical discs or credit cards, characterized in comprising:*

*a machine body being provided with a power switch on a surface thereof and* one set of *intermeshing shredding blades therein;*

*two inports on an upper lid thereof, the inports including a paper inport with an opening* [[of a larger dimension]] with a greater length in the upper lid sized to receive a piece of paper, *and inclined*[[, curved]] *channel walls* wherein the opposing, spaced apart channel walls curve in the same direction for feeding paper into the shredding blades, *and a disc or card inport with an opening* [[of a smaller dimension]] with a lesser length in the upper lid sized to receive an optical disc or credit card, *and vertical channel walls, the inports* [[being each led]] *leading to the shredding blades such that, regardless of whether the type of substance being fed by a user is paper, an optical disc, or a card, the paper, card, or disc can all be shredded by the shredding blades through the intermeshing of the blades.*

*8. The dual-functional medium shredding machine structure of claim 5, wherein the paper inport and the disc or card inport* [[are]] *both* [[led]] lead *to the shredding blades, and a single switch is provided between the shredding blades such that regardless of the type of substance being fed by a user, the paper, disc, or credit cards can all cause the switch to activate the shredding blades to perform a shredding task while the scraps are all dispensed to an identical bin.*

*10. A dual-functional medium shredding machine structure, that allows shredding of paper and optical discs or credit cards, characterized in comprising:*

*a machine body being provided with* one set of *intermeshing shredding blades therein;*

*two inports on an upper lid thereof, the inports including a paper inport with an opening* [[of a larger dimension]] with a greater length in the upper lid sized to receive a piece of paper, *and inclined*[[, curved]] *channel walls* wherein the opposing, spaced apart channel walls curve in the same direction for feeding paper into the shredding blades, *and a disc or card inport with an opening* [[of a smaller dimension]] with a lesser length in the upper lid sized to receive an optical disc or credit card, *and vertical channel walls, the inports* [[being each led]] leading *to the shredding blades such that, regardless of whether the type of substance being fed by a user is paper, an optical disc, or a card, the paper, card, or disc can all be shredded by the shredding blades through the intermeshing of the blades.*

* * * * *